United States Patent [19]

Troxler

[11] 4,445,704

[45] May 1, 1984

[54] CONTROL ASSEMBLY FOR BICYCLES

[76] Inventor: A. Ray Troxler, 4801 Summit Ave., Greensboro, N.C. 47205

[21] Appl. No.: 323,308

[22] Filed: Nov. 20, 1981

[51] Int. Cl.³ .................. B62K 21/00; B62K 21/10
[52] U.S. Cl. .................. 280/292; 280/272; 280/289 R
[58] Field of Search ............ 280/289 R, 272, 292, 280/293, 295, 296, 202, 47.11, 47.13 R, 47.17, 47.34, 47.37 R

[56] References Cited

U.S. PATENT DOCUMENTS

| | | | |
|---|---|---|---|
| 619,646 | 2/1899 | Ward | 280/296 |
| 2,415,735 | 2/1947 | Fastborg | 280/272 |
| 2,516,431 | 7/1950 | Sokolik | 280/289 R |
| 2,629,611 | 2/1953 | Covington | 280/292 |
| 2,672,351 | 3/1954 | Kane | 280/47.34 |
| 3,485,507 | 12/1969 | Christof | 280/293 |

Primary Examiner—Joseph F. Peters, Jr.
Assistant Examiner—Donn McGiehan

[57] ABSTRACT

A control assembly is disclosed for attachment to a bicycle to enable an ambulant cyclist to propel and steer his vehicle while walking or running alongside, or to the rear, thereof. A preferred embodiment of the assembly comprises two components which attach to the vehicle, the first secured to the front end to limit lateral movement of the front wheel, and the second secured to the rear end to permit foward and directional momentum imparted thereto to be transmitted to the vehicle. A second embodiment of the assembly employs only the second component attached to the bicycle handlebars. This embodiment of the invention permits control of both direction and movement of an otherwise unstable vehicle at a single location on the vehicle.

8 Claims, 8 Drawing Figures

CONTROL ASSEMBLY FOR BICYCLES

BACKGROUND OF THE INVENTION

This invention relates to bicycles, and more particularly to an assembly for controlling forward and lateral momentum of the bicycle by an ambulant cyclist.

The recent energy conservation movement in this country has spawned increased efforts to reduce the use of gasoline-dependent devices for travel. Many people have investigated walking, jogging and cycling, and have found one or more of them to be viable alternatives, not only as a mode of transportation, but also as a device for developing or maintaining fitness.

The present invention offers an ambulant individual the flexibility of taking his "wheels" with him and maneuvering his cycle when he is afoot. The present invention thus makes it possible for the operator of a bicycle to controllably propel the vehicle while walking or running alongside, or to the rear, thereof.

The following United States Patents teach various assemblies that attach to a bicycle and aid in maintaining its stability: U.S. Pat. Nos. 502,866; 591,830; 671,049; 1,230,801; 2,087,535; 2,415,735; 2,516,431; 2,629,611; and 4,191,393.

U.S. Pat. Nos. 502,866; 591,830; 671,049; 1,230,801; and 2,087,535 disclose assemblies that aid in the steering of the bicycle when a rider is seated thereon.

U.S. Pat. Nos. 2,415,735 and 2,516,431 illustrate devices used to stabilize a bicycle while it is parked, the former teaching the interconnection of the downtube with the bicycle front fork, and the latter teaching the interengagement of the downtube with the front tire fender.

U.S. Pat. No. 4,191,393 illustrates a luggage carrier attachment for connection to the rear fork of a bicycle.

None of the foregoing patents disclose a simple assembly of components which interact with one another to assist steering control of a bicycle. U.S. Pat. No. 2,629,611 mentioned above teaches an attachment for a bicycle to enable its being towed. The patented device maintains the wheels substantially aligned with the frame, and additionally provides an auxillary braking mechanism. While the device is used when the rider is afoot, the rider pulls, rather than pushes, the bicycle, and therefore he is located in front of the vehicle. Thus, aside from the obvious structural differences between the patent and the present invention, the patent is not concerned with keeping the ambulant rider's feet out of contact with the bicycle pedals.

OBJECTS OF THE INVENTION

It is therefore an object of the proposed invention to provide a novel and unique mechanism for controlling a normally unstable vehicle.

Another object of the present invention is to provide a control assembly for steering and propelling a two-wheeled vehicle by its ambulant operator.

Yet another object is to provide an assembly for control of a moving riderless bicycle by its ambulant operator.

Still another object of this invention is to provide a control device for propelling and stabilizing a bicycle by its operator running or walking therebehind.

An additional object of the present invention is to provide a control device which is removably attachable to a bicycle, and which pivots from an operative wheel-blocking position to an inoperative storage position.

Still another object is to provide separate control assembly components which are easily assembled and affixed to a bicycle, and which are attractive in design and may be inexpensively manufactured for mass production.

BRIEF DESCRIPTION OF THE DRAWINGS

Other objects and many of the attendant advantages of the present invention will readily be appreciated as the same becomes better understood by reference to the following detailed description when considered in connection with the accompanying drawings in which.

DETAILED DESCRIPTION OF THE PREFERRED EMBODIMENTS

Figure 1:
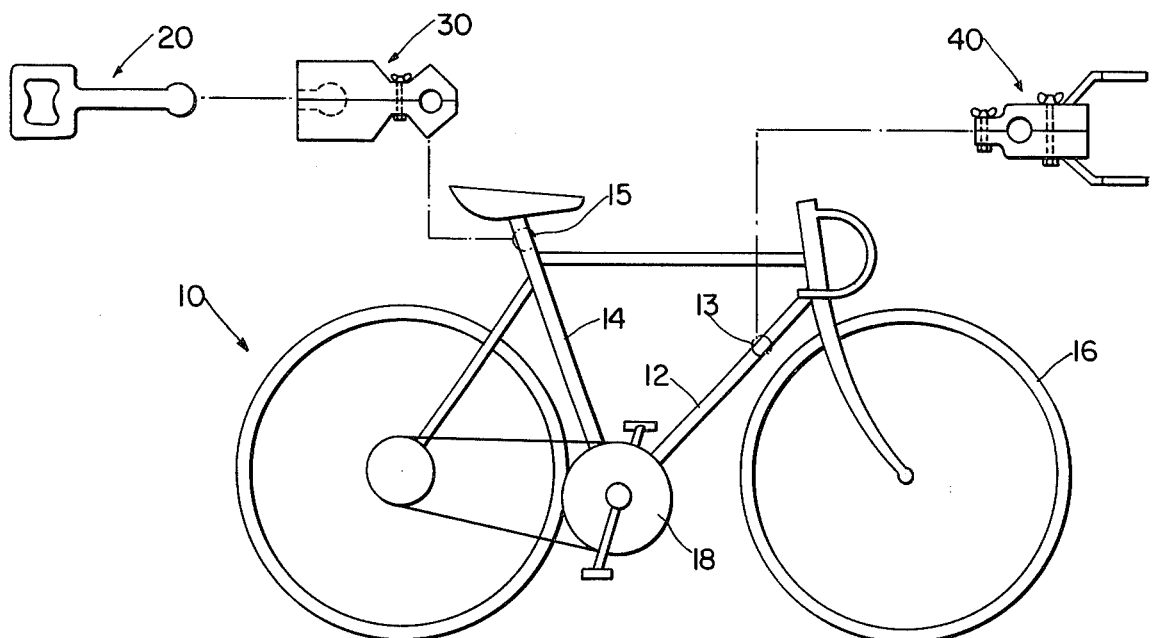
FIG. 1 schematically illustrates the control assembly of the present invention and its location relative to a conventional bicycle when attached.

Referring now to the drawings, wherein like reference numerals represent identical or corresponding parts throughout the several views, and more particularly to FIGS. 1-4 thereof, there is illustrated a first preferred embodiment of the control assembly of the present invention.

FIG. 1 shows a conventional bicycle 10, and illustrates the location of attachment of the control assembly to the bicycle frame. The bicycle includes a forwardly located downtube 12 and a seat tube 14 positioned rearwardly thereof, the two tubes meeting at the pedal assembly 18. The control assembly is shown to comprise handle or grip 20, coupler 30, and stabilizer or guide 40. Guide 40 is positioned at a location 13 on downtube 12 where the distance between the downtube and tire 16 is a minimum. Grip 20 interfits with coupler 30 in a manner which will be described in more detail below, and coupler 30 is attached to seat tube 14 at a position 15 below the seat.

Figure 2:
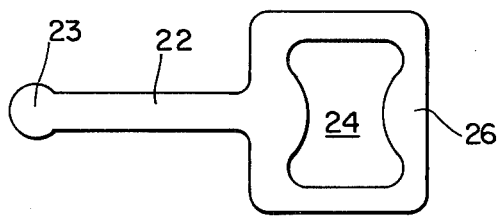
FIG. 2 shows the grip element of the first component of the present invention.

FIG. 2 depicts the grip as having shank 22 including a ball coupling 23 at the free end thereof, and grasping frame 26 defining opening 24.

Figure 3:
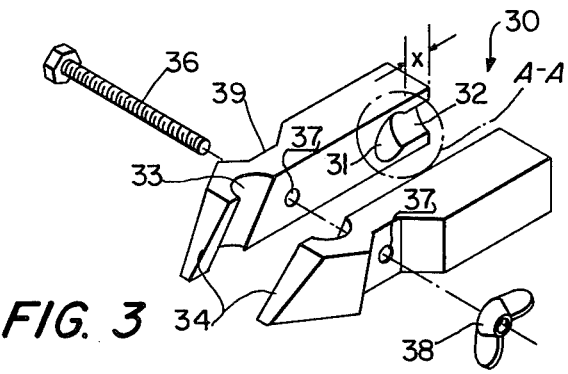
FIG. 3 shows the coupler of the first component of the present invention.

FIG. 3 illustrates coupler 30 employed to interconnect grip 20 with seat tube 14 of the bicycle of FIG. 1. The coupler comprises two substantially identical halves 37,37 which are fastened together about seat tube 14 at a convenient point which is just a short distance below the seat of the bicycle. Each half includes a respective portion of socket 31, first or rear channel 32, and second or front channel 33. The second channel is disposed obliquely within the forward region of the coupler halves, and each forward face 34 of the halves is preferably streamlined as shown, but may be any shape or design desired or convenient for manufacture. Any conventional bolt 36 may be used with any conventional nut, shown by way of example in FIG. 3 as a wing nut, to clamp coupler 30 to seat tube 14 by inserting the bolt through openings 37 in the coupler halves such that channel 33 receives, and disposed about, seat tube 14. The rear portion of coupler 30 receives and interconnects ball 23 of the grip 20 with seat tube 14, and first channel 32 is shown to have a predetermined length "x". By decreasing length "x" of channel 32, the degree of freedom of movement of shank 22 of the handle 20 relative to coupler 30 is increased. That is to say, the amount of movement or "play" of handle 20 in coupler 30 can be controlled by appropriately selecting the length "x" of channel 32.

Figure 4:
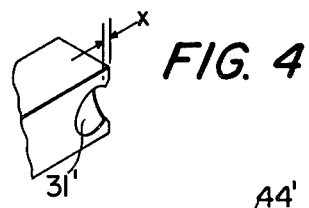
FIG. 4 illustrates an enlarged view of region A—A of the coupler of FIG. 3.

FIG. 4 is an enlarged view of the region A—A in FIG. 3, and illustrates the first channel of the coupler halves, where the length "x" is minimized, thus leaving socket 31' with no channel.

Figure 5:
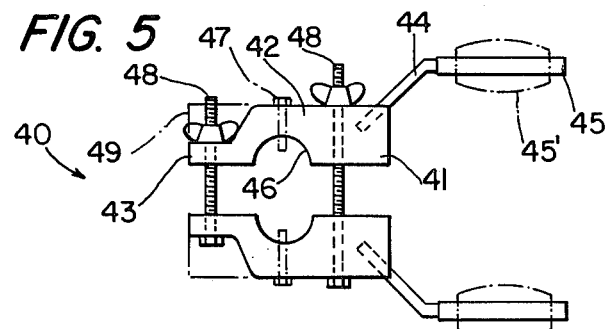
FIG. 5 depicts the details of the stabilizer of FIG. 1.

Stabilizer or guide 40 is depicted in FIG. 5 and is shown to include two substantially identical halves, each comprising a front portion 41, central portion 42 and rear portion 43. Front portion 41 of each half supports rod 44 which carries a bearing surface, e.g., an elastomeric sleeve 45 or bushing 45', the latter being optionally mounted for axial rotation about rod 44. Central portion 42 of each half includes hemispherical cut-out 46 for closely receiving down tube 12, and optionally may include bolts or threaded pins 47 for providing extra clamping force when the guide halves are bolted down on down tube 12. Mounting of the stabilizer on down tube 12 at the position 13, as described above in connection with the description of FIG. 1, is effected easily by (1) disposing both halves about the down tube with the rods of the front portion capturing the front wheel, and (2) tightening bolt assemblies 48, which cooperate in a manner well-known in the art with holes provided in the front and rear portions of the stabilizer, to squeeze and thus clamp the halves together about downtube 12. Rear portion 43 of the stabilizer 40 may optionally be provided with a thicker cross-section 49, shown in phantom in FIG. 5.

Figure 6:
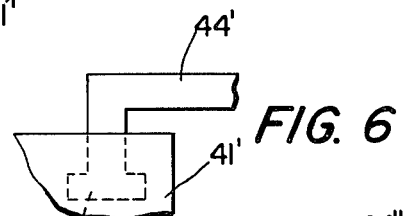
FIG. 6 shows a second embodiment of the stabilizer of the present invention.

A modification of the FIG. 5 rod 44 is shown in FIG. 6 in which rod 44' is pivotally mounted in front portion 41' of the stabilizer at pivot 50'. This modification of the stabilizer permits the rearward pivoting of rods 44' out of a blocking position so that when the rider mounts the bicycle for normal use, the front wheel of the bicycle is once again free to pivot in response to pivotal motion imparted to the handle bars.

Figure 7:
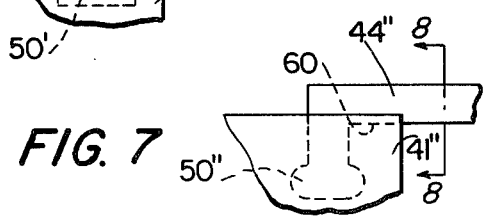
FIG. 7 is an illustration of a third embodiment of the stabilizer of the present invention.
Figure 8:
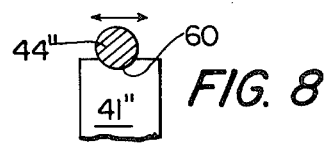
FIG. 8 is a cross-sectional view taken along section lines 8—8 in FIG. 7, and through rod 44".

FIGS. 7 and 8 show a second modification of the rod 44 and front portion 41 of FIG. 5. In FIG. 7, rod 44" includes one end 50" pivotally mounted in a socket in front portion 41" of the stabilizer. The free end of rod 44" (extending to the right, but not shown) terminates as in FIG. 5 in an elastomeric sleeve or bushing. Unlike the embodiments of FIGS. 5 and 6, rod 44" is in contact with, i.e., rests on, front portion 41" when the rod is in the position operative to capture front wheel 16 of the bicycle. This contact between rod 44" and front portion 41" is facilitated by groove 60 which interacts with rod 44" to provide a kickstand-type detent lock so that rod 44" is in its operative position when disposed in the groove. This locking and unlocking arrangement is better illustrated in FIG. 8 which shows rod 44" seated in groove 60 in front portion 41". The arrow above rod 44" represents the lateral motion of which rod 44" is capable when removed from groove 60. Removal of the rod 44" from groove 60 is effected simply by pivoting the rod about pivot 50". In this way, the rod 44" is resiliently cammed out of engagement with the groove and thereby made free to pivot to a rearward inoperative position. A second groove similar to groove 60 may be located rearwardly of pivot 50" so that rod 44" may be locked in its inoperative position.

The control assembly just described above lends itself to quick and easy mounting as a removable kit or add-on feature, or may be securely mounted on the bicycle as a substantially permanent feature.

The components of the control assembly may be fabricated of metal, plastic or any material which preferably affords sturdy, durable and lightweight construction.

The control assembly components, when assembled and mounted on the bicycle, afford maximum control and protection against the user's feet becoming entangled in the pedals of the bicycle while the user runs or walks alongside or behind the bicycle. The grip 20 may be engaged by either the right or the left hand of the user, and direction to the right or left is imparted to the bicycle by application of force in the same direction.

As an alternative to employing all three components, a second control assembly comprising the handle and coupler may be employed to effect the same function as the first assembly described above by attaching the second assembly to the left or right handle bar, only. Thus by walking or running alongside the bicycle handlebars, the user may grasp the handle of the second control assembly and cause forward and directional movement of the bicycle merely by imparting appropriate forces to the handle.

Obviously many modifications and variations of the present invention are possible in light of the above teachings. It is therefore understood that, within the scope of the appended claims, the invention may be practiced otherwise than as specifically described herein.

I claim as my invention:

1. In a two-wheel cycle having a forward steering wheel and a rear wheel and a pedal assembly located between said wheels, a control assembly mounted on said cycle enabling an ambulant person to push the cycle and maintain its stability when in motion, comprising:

means removeably attachable to said cycle for directly transferring momentum imparted to said cycle by the ambulant person, and means for restraining pivotal movement of said steering wheel, said restraining means comprising opposing arm means for capturing a portion of said steering wheel therebetween, said arm means being pivotable between a first operative position wherein said steering wheel portion is captured therebetween, and a second inoperative position wherein said arm means are pivoted rearwardly of said first position and lateral movement of said steering wheel is unrestrained.

2. The control assembly of claim 1 wherein said restraining means is mounted on said cycle forwardly of said pedal assembly.

3. A control assembly for a two-wheel cycle which enables an ambulant operator to maintain the stability of the cycle when in motion, comprising;

means, removably attachable to said cycle and responsive to momentum input from said operator, for controlling the steering of said cycle, said controlling means comprising a first assembly and a second assembly, said first assembly including handle means having a male portion at one end, and means for coupling said handle means to said cycle, said coupling means defining a female portion at one end cooperable with said male portion of said handle means to receive said male portion therein, said coupling means being attachable to the cycle rear portion and comprising two members adapted to be clamped together about the seat post of the cycle, said two members defining therebetween said female portion, and said second assembly including means for restraining pivotal movement of the steering wheel of said cycle, said restraining means comprising a pair of arms, said arms being pivotable between a first operative position wherein said steering wheel is captured therebetween, and a second inoperative position where said arms are directed rearwardly of said second assembly, whereby momentum imparted to said controlling means is transfered directly to the cycle from the operator, thereby enabling the ambulant operator to steer and propel the cycle and thus maintain its stability.

4. In a two-wheel cycle having forward and rear wheels and a pedal assembly located therebetween, the wheels normally lying in a plane defined by the frame of the cycle, a control assembly for pushing the two-wheel cycle which enables an ambulant person to maintain the stability of the cycle when in motion, comprising:

means, attachable to said cycle and responsive to momentum input from said person, for controlling the steering of said cycle, said controlling means including means for directly transferring said momentum input from said person to said cycle at a point thereon lying within said plane, said controlling means comprising first and second assemblies, said first assembly defining handle means located rearwardly of the pedal assembly, and said second assembly comprising means for restraining pivotal movement of the forward wheel of said cycle relative to said plane, said second assembly being located forwardly of said pedal assembly.

5. The control assembly of claim 4 wherein said first assembly further comprises means for coupling said handle means to said cycle, and said second assembly being attachable to the forward portion of said cycle.

6. The control assembly of claim 5 wherein said handle means comprises at one end a male portion, and said coupling means defines at one end a female portion, said female portion being cooperable with said handle means to receive said male portion therein, and said restraining means of said second assembly comprising a pair of arms extending generally forwardly and capturing said forward wheel therebetween.

7. The control assembly of claim 6 wherein said coupling means comprises two members adapted to be clamped together about the seat post of said cycle, said two members defining therebetween said female portion.

8. The control assembly of claim 6 wherein said coupling means comprises two members clampable together about a portion of said cycle, said two members defining therebetween said female portion.

* * * * *